(12) United States Patent
Watanabe

(10) Patent No.: US 7,700,881 B2
(45) Date of Patent: Apr. 20, 2010

(54) SHIELDED CONDUCTOR FOR VEHICLE

(75) Inventor: Kunihiko Watanabe, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 84 days.

(21) Appl. No.: 11/988,401

(22) PCT Filed: Sep. 8, 2006

(86) PCT No.: PCT/JP2006/317829

§ 371 (c)(1),
(2), (4) Date: Jan. 7, 2008

(87) PCT Pub. No.: WO2007/029801

PCT Pub. Date: Mar. 15, 2007

(65) Prior Publication Data

US 2009/0107694 A1    Apr. 30, 2009

(30) Foreign Application Priority Data

Sep. 8, 2005    (JP) ............................. 2005-260746

(51) Int. Cl.
*H01B 7/00* (2006.01)
(52) U.S. Cl. .................. 174/110 R; 174/113 R; 174/120 R
(58) Field of Classification Search .................. 174/36, 174/110 R, 113 R, 116, 118, 120 R, 121 R
See application file for complete search history.

(56) References Cited

U.S. PATENT DOCUMENTS

| | | | | |
|---|---|---|---|---|
| 1,883,648 A | * | 10/1932 | Luigi | 174/26 R |
| 2,787,651 A | * | 4/1957 | Lapsley | 174/32 |
| 3,591,770 A | * | 7/1971 | Ando | 219/540 |
| 3,594,492 A | * | 7/1971 | Bahder et al. | 174/36 |
| 4,600,806 A | * | 7/1986 | Beretta | 174/121 A |
| 4,639,544 A | * | 1/1987 | Dableh et al. | 174/32 |
| 4,707,569 A | * | 11/1987 | Yoshimura et al. | 174/116 |
| 5,932,306 A | | 8/1999 | Usui | |
| 6,030,672 A | | 2/2000 | Usui | |
| 6,806,418 B2 | * | 10/2004 | Donazzi et al. | 174/36 |
| 7,094,970 B2 | | 8/2006 | Kihira | |
| 7,241,951 B2 | * | 7/2007 | Donazzi et al. | 174/36 |
| 2001/0030121 A1 | | 10/2001 | Ono et al. | |

FOREIGN PATENT DOCUMENTS

| | | |
|---|---|---|
| EP | 1 143 458 A1 | 10/2001 |
| JP | A-09-011398 | 1/1997 |
| JP | A-11-041768 | 2/1999 |
| JP | A 11-250743 | 9/1999 |

(Continued)

OTHER PUBLICATIONS

Office Action issued in Chinese Patent Application No. 200680032584.4; Nov. 27, 2009; with English-language translation.

*Primary Examiner*—William H Mayo, III
(74) *Attorney, Agent, or Firm*—Oliff & Berridge, PLC.

(57) ABSTRACT

A shield conductor has a metal pipe and wires accommodated in the metal pipe. The metal pipe is stainless steel, and the stainless steel pipe is provided with a resin layer containing a magnetic material.

7 Claims, 8 Drawing Sheets

FOREIGN PATENT DOCUMENTS

| | | |
|---|---|---|
| JP | A-2001-283652 | 10/2001 |
| JP | A-2003-068151 | 3/2003 |
| JP | A-2004-027064 | 1/2004 |
| JP | A-2004-171952 | 6/2004 |
| JP | A-2005-235409 | 9/2005 |
| JP | A-2005-267873 | 9/2005 |

* cited by examiner

SHIELDED CONDUCTOR FOR VEHICLE

TECHNICAL FIELD

The present invention relates to a shielded conductor for a vehicle to be mounted on an electric vehicle.

BACKGROUND ART

One example of a known shielded conductor of this type is a shielded conductor that has a plurality of unshielded wires and a pipe for accommodating the wires to protect them as well as for functioning as an electromagnetic shielding layer (Patent Document 1). One pipe considered to be used as a shielded conductor of this type is made of stainless steel, which is superior in corrosion resistivity.

[Patent Document 1] Japanese Unexamined Patent Application Publication 2004-171952

The stainless steel pipe, however, is inferior in the shielding property, for example, in a high frequency bandwidth higher than 100 MHz. The shielded conductor therefore cannot provide a sufficient shielding effect in the high frequency bandwidth in some cases.

The present invention was achieved in accordance with the circumstances as described above, and its object is to provide a shielded conductor for a vehicle that is capable of providing a sufficient shielding effect even in the high frequency bandwidth.

DISCLOSURE OF THE INVENTION

A shielded conductor for a vehicle, for use with an electric vehicle, is configured to include a pipe mounted on the electric vehicle and a wire inserted in the pipe configured as a power line of the electric vehicle, where the pipe includes a synthetic resin layer that contains a magnetic material.

An absorbed electromagnetic wave energy P per unit volume of a magnetic body is expressed by an approximate expression as follows:

$$P \propto \omega \mu'' H^2 \propto \omega \mu H^2$$

where a reference symbol $\omega$ is an angular velocity of an electromagnetic wave ($=2\Pi f$), $\mu$ is a imaginary part of a complex permeability of the magnetic body, $\mu''$ is the complex permeability of the magnetic body, and H is intensity of a magnetic field.

The absorbed electromagnetic wave energy P, as is understood from the above approximate expression, is proportional to the amount of a magnetic loss ($\omega \mu'' H^2$), while the magnetic loss is proportional to a frequency f and the magnitude of a complex permeability $\mu$. It is generally said that the absolute value of the complex permeability of iron is approximately 1000, which allows iron to perform higher shielding effect. Iron, however, is easy to rust and inferior in corrosion resistivity. For example, SUS430 that forms the metal pipe has complex permeability of $\mu \geq 20$, and therefore its value of magnetic loss in high frequencies is lower than the counterpart of iron. On the other hand, ferrite has complex permeability of $\mu \geq 1000$. By using a magnetic material having a larger $\mu$, such as ferrite, the magnetic loss in the high frequency bandwidth is enlarged and the absorbed electromagnetic wave energy P is enlarged, and thus performance of sufficient shielding effect is enabled.

It is preferable that the pipe is a metal one. Specifically, it is advantageous in cost to form the pipe out of SUS430 stainless steel. In addition, in order to enlarge the magnetic loss in the high frequency bandwidth, it is more preferable to apply ferrite as the magnetic material that has a larger complex permeability.

EXPLANATION OF NUMERALS

Wa . . . a shielded conductor
10 . . . an unshielded wire
20 . . . a metal pipe
21 . . . a coating layer
30, 30A . . . a resin layer (a resin filler layer)

BEST MODE FOR CARRYING OUT THE INVENTION

First Embodiment

Figure 1:
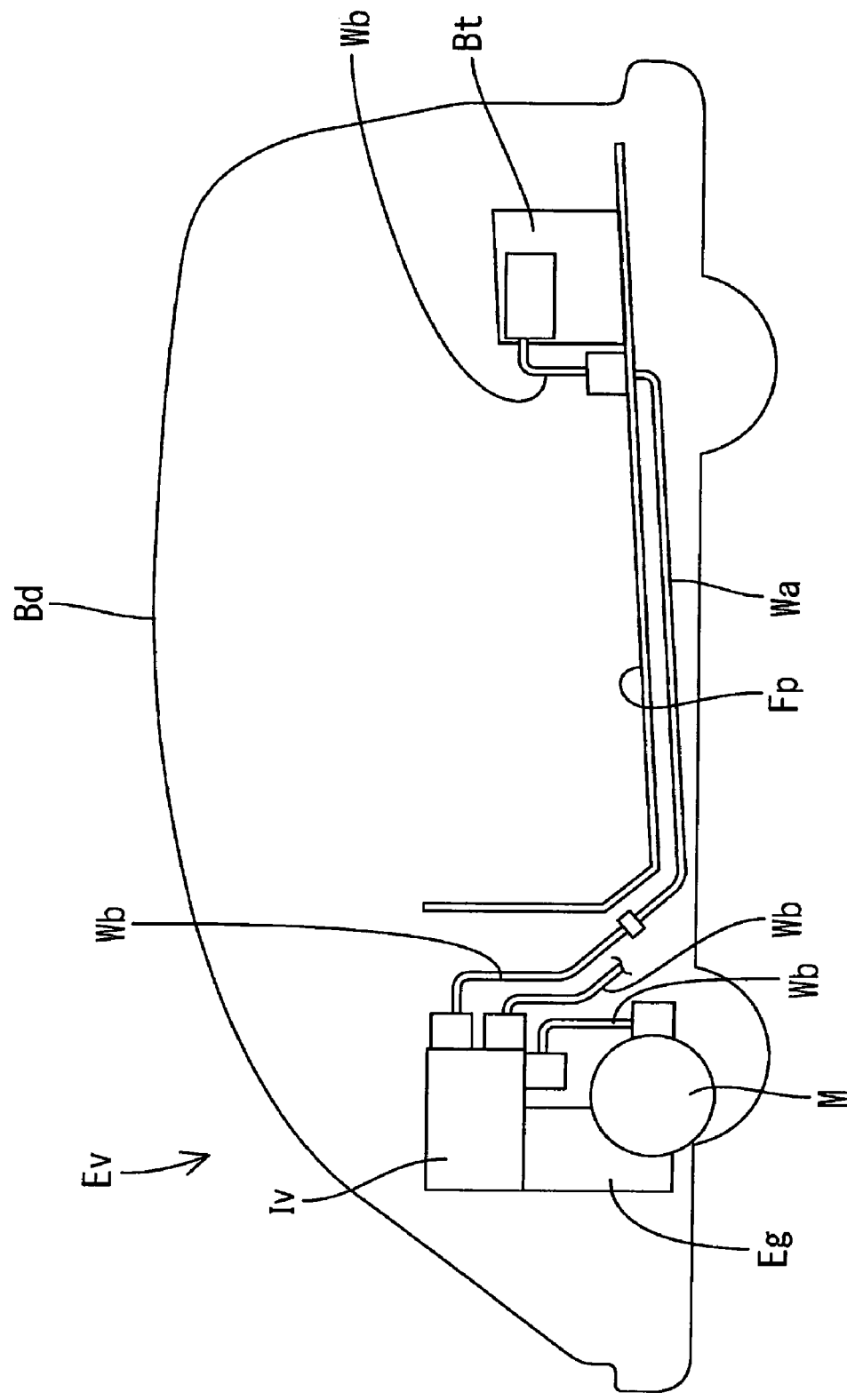
FIG. 1 is an schematic inner structure of a vehicle showing a shielded conductor of a first embodiment.
Figure 2:
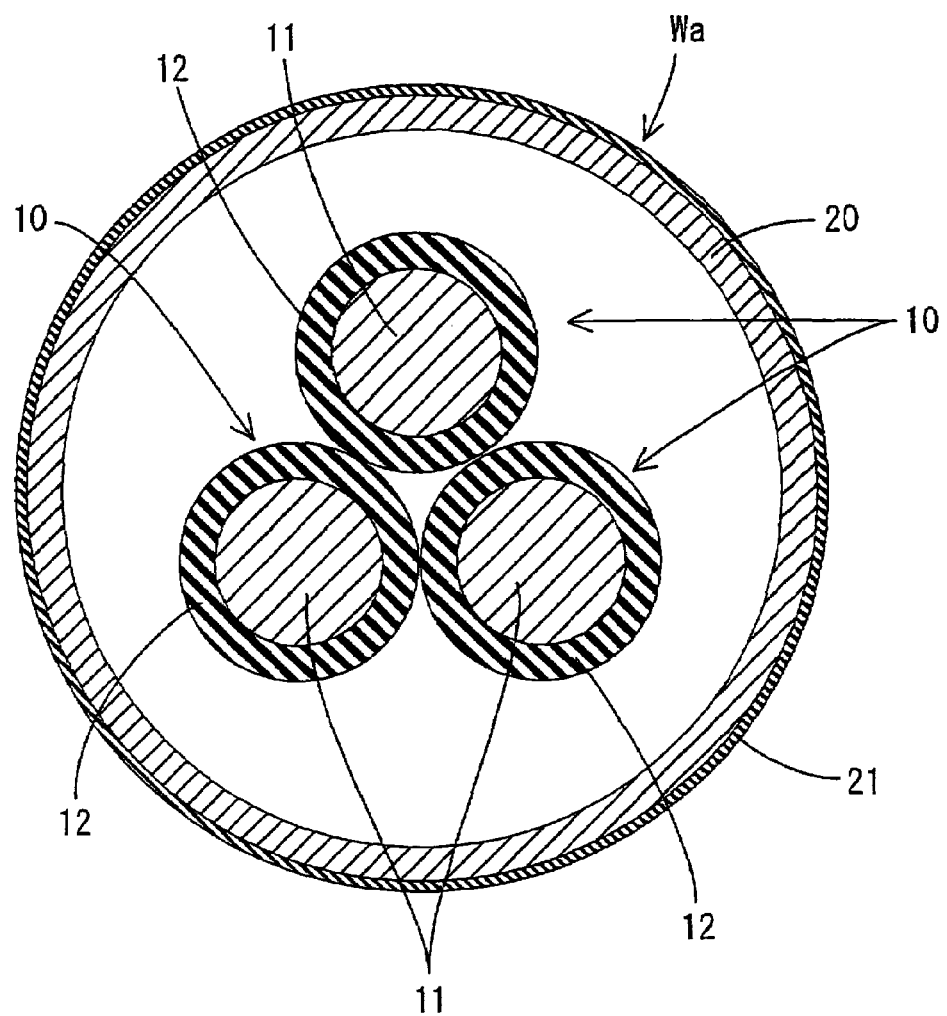
FIG. 2 is a cross-sectional view showing the shielded conductor of the first embodiment.

A first embodiment according to the present invention will be explained with reference to FIGS. 1 through 5. An electric vehicle EV has a body Bd and an engine room in a front portion of the body Bd. An inverter Iv configuring a motor driving circuit and a gasoline engine Eg are accommodated in the engine room. A battery Bt configuring a motor circuit is mounted in a rear portion of the body Bd. A motor M for running front wheels is disposed below the engine room, while another motor (not illustrated) for running rear wheels is disposed in the rear portion of the body Bd. A shielded conductor Wa and an interior conducting path Wb are conductively connected between the inverter Iv and the Battery Bt, while another interior conducting path Wb is conductively connected between the inverter Iv and the motor M for running the front wheels, and another shielded conductor Wa and the other interior conducting path are conductively connected between the inverter Iv and the motor for running the rear wheels. Each of the shielded conductors Wa according to the present invention has a configuration that three unshielded wires 10 are accommodated in a metal pipe 20, as shown in FIG. 2.

Each of the unshielded wires 10 includes a metal (e.g. copper alloy) core 11 and an insulating layer 12 formed by resin on the outside of the core 11. The core 11 is either a strand wire made by twisting a plurality of thin wires (not illustrated) or a single wire. Each of the unshielded wires has a circular cross section.

The metal pipe 20, as shown in the Figures, accommodates the three unshielded wires 10, thereby protecting them. The metal pipe 20 is made of stainless steel (SUS430 in this embodiment) and has a circular cross section.

The three unshielded wires 10 are inserted in the metal pipe 20 in a stacked form having a generally triangular cross section as a whole. The inner diameter of the metal pipe 20 is arranged to be larger than the maximum outer diameter of the set of wires 10 in a stacked form having a generally triangular cross section as a whole, which allows the wires 10 to be easily inserted into the metal pipe 20. After insertion of the unshielded wires 10 into the metal pipe 20, the metal pipe 20 is bent into a predetermined shape, and is secured to, for example, an outer bottom surface of the body Bd via a bracket (not illustrated).

In the present embodiment, a coating layer 21 is formed around the outer peripheral surface over the entire length of the metal pipe 20. The coating layer 21 is formed by applying paint containing a magnetic material (in this embodiment a ferrite powder) around the outer peripheral surface over the entire length of the metal pipe 20. The ferrite content and the thickness of the coating layer 21 may be set in accordance with a required shielding effect or the circumstances where the shielded conductor Wa is used, or the like. In this embodiment, the ferrite content and the thickness of the coating layer 21 is adjusted such that the amount of ferrite powder per square millimeter of the coating layer is 0.211 mg.

Figure 3:
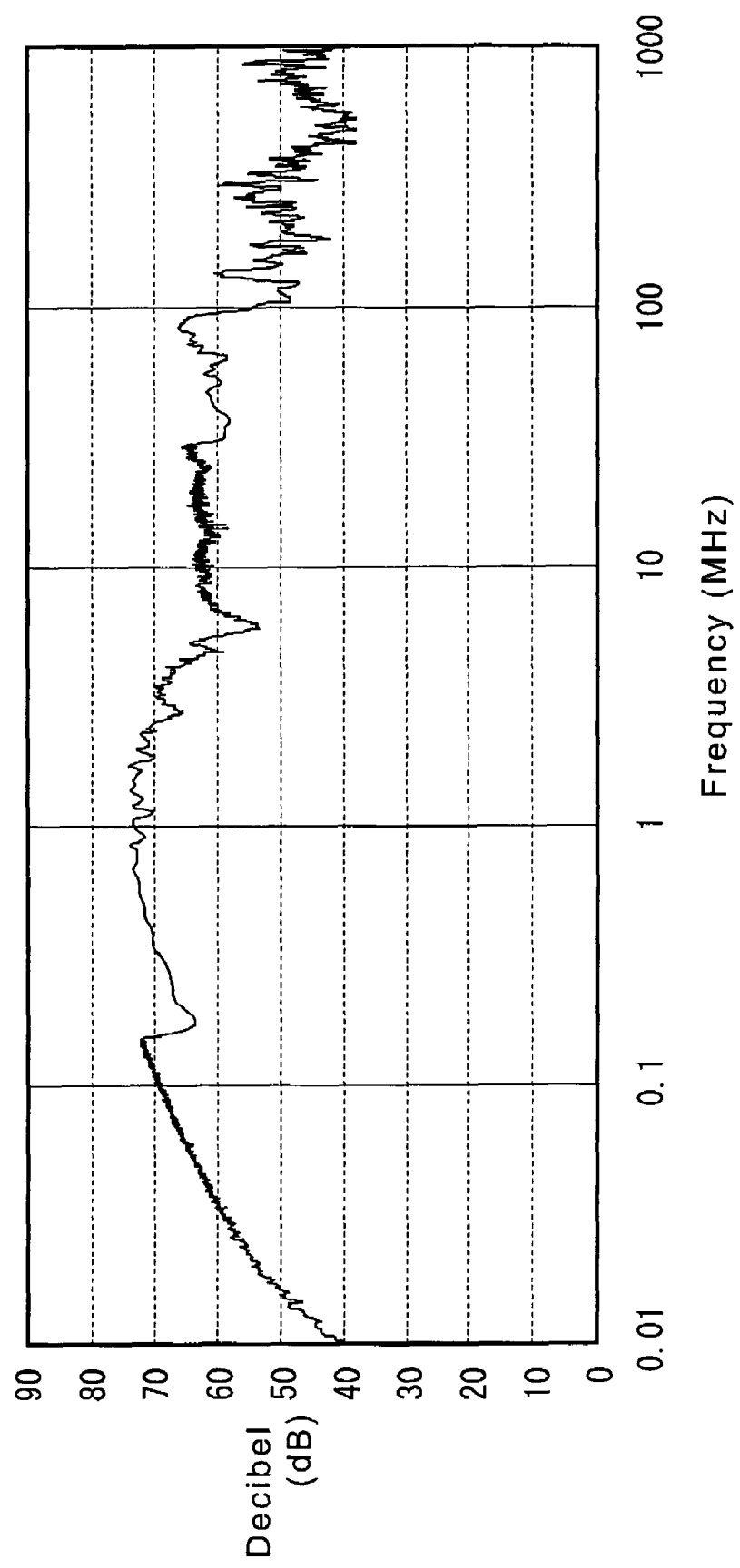
FIG. 3 is a graph showing a shielding effect of a shielded conductor where electric wires are accommodated in braided wires made by braiding thin metal wires.
Figure 4:
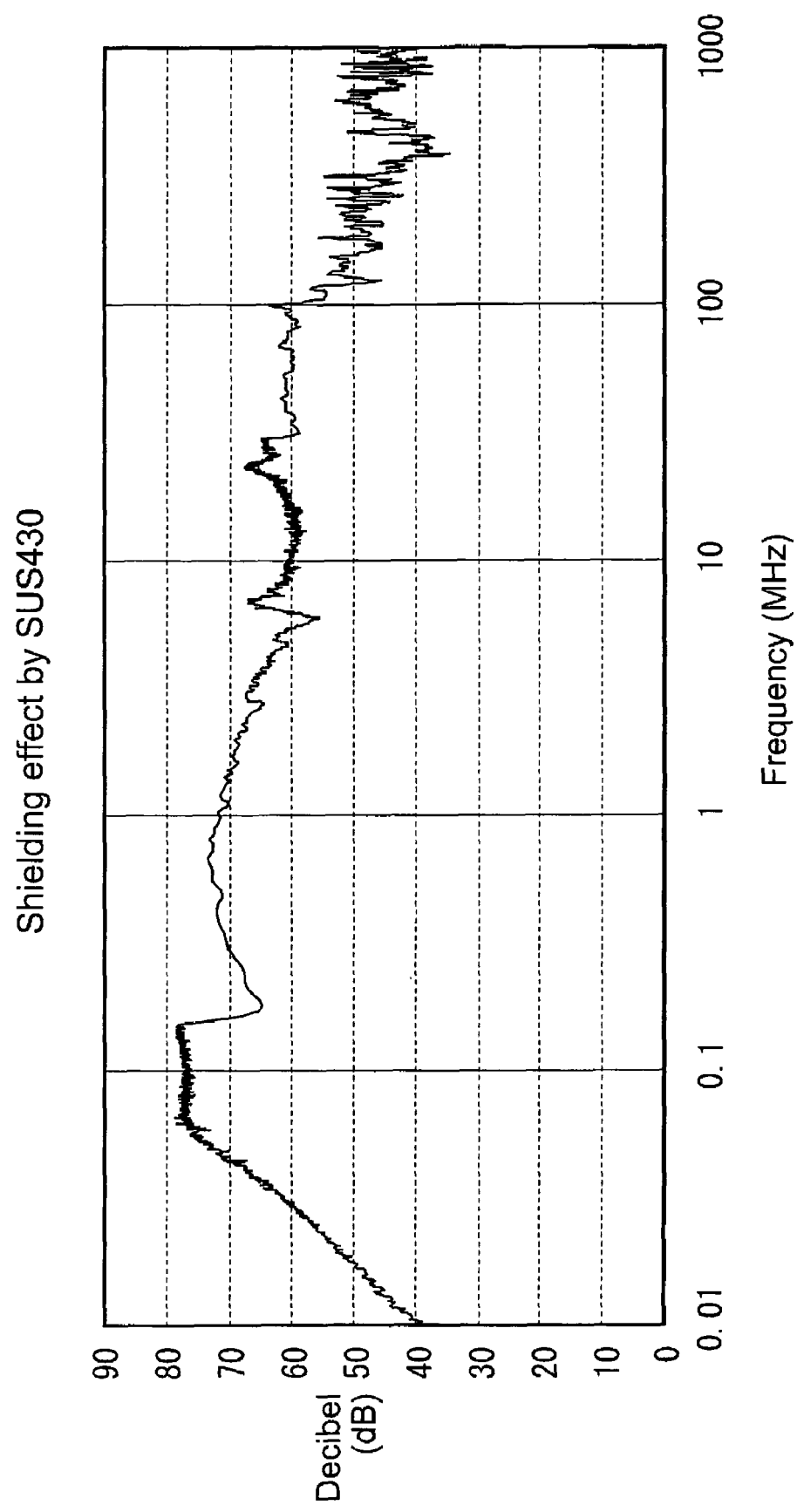
FIG. 4 is a graph showing a shielding effect of a shielded conductor where the electric wires are accommodated in a SUS430 stainless pipe.
Figure 5:
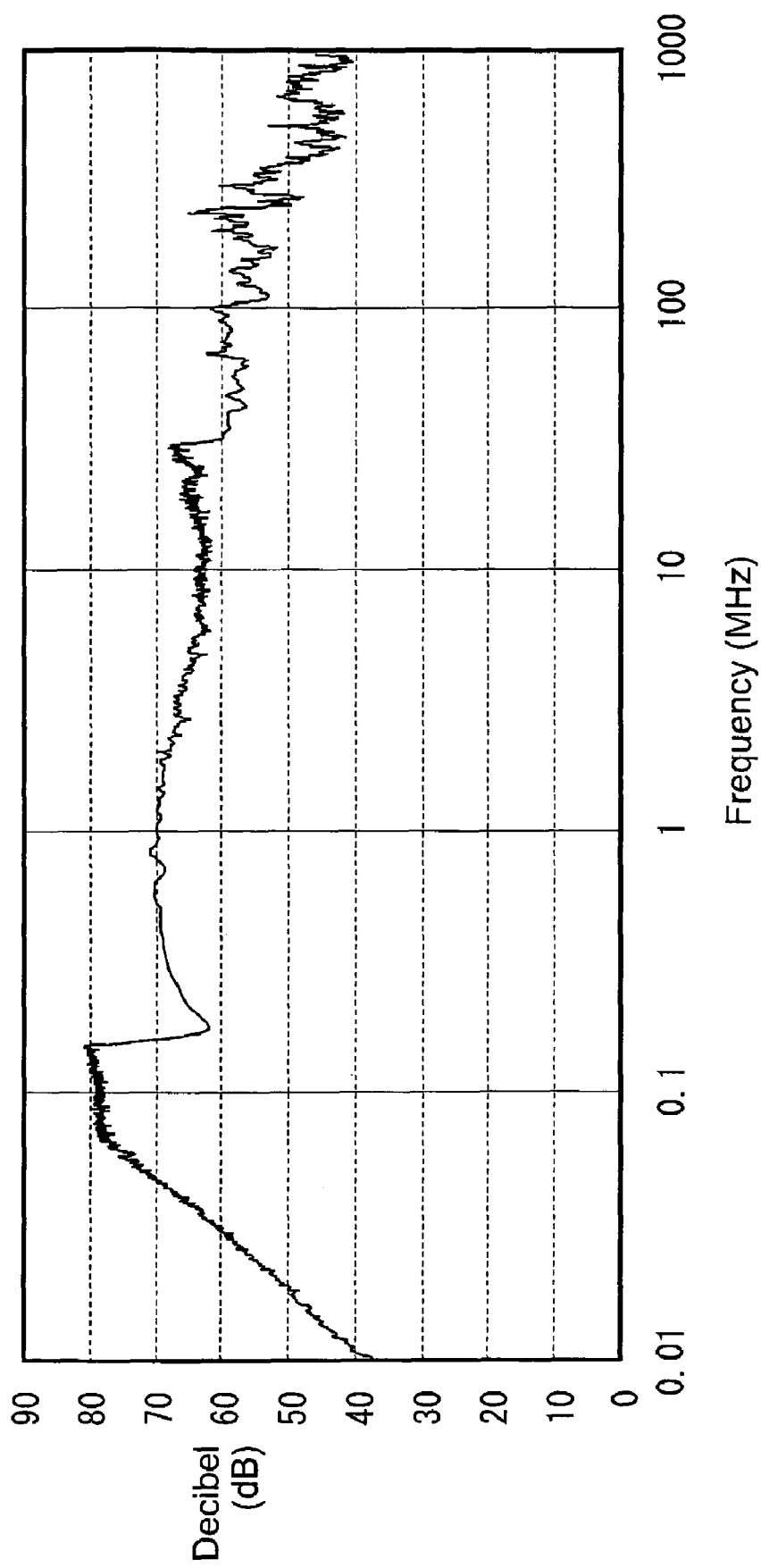
FIG. 5 is a graph showing a shielding effect of the shielded conductor of the first embodiment.
Figure 6:
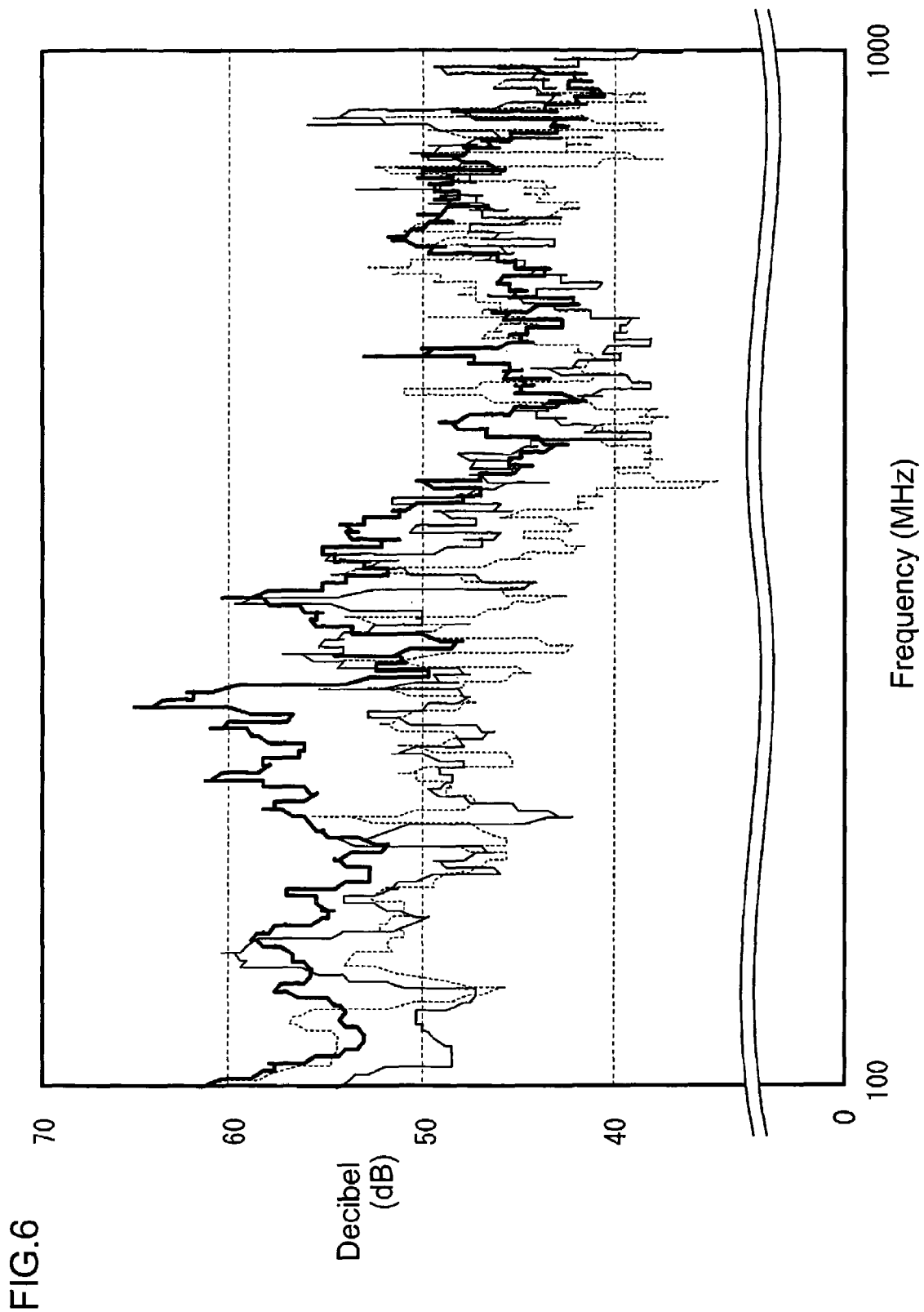
FIG. 6 is a graph comparing the shielding effects in a high frequency bandwidth.

A shielding performance of the shielded conductor Wa of the present embodiment and the counterparts of a first and second comparative examples each were measured by a method in conformity with a known absorption clamp method. FIGS. 3 and 4 each show results of measurements on the first and second comparative examples, respectively, while FIG. 5 shows a result of measurements on the present embodiment. Note that the first comparative example is a shielded conductor including a braided shielding layer made of thin metal wires braided into a tubular shape and three unshielded wires that are similar to those of the first embodiment and accommodated in the braided shielding layer, while the second comparative example is a shielded conductor including a metal pipe (without a coating layer) made of SUS430 stainless steel and three unshielded wires that are likewise similar to those of the first embodiment and accommodated in the metal pipe. FIG. 6 comparatively shows the first and second comparative examples as well as the present embodiment by extracting their effects in a high frequency bandwidth higher than 100 MHz. Note that FIGS. 3 through 6 show the attenuations in dB.

As apparent from comparison of FIGS. 2 through 6, the shielded conductor Wa of the present embodiment has a high shielding effect specifically in the high frequency bandwidth higher than 100 MHz.

Furthermore, since the metal pipe 20 of the shielded conductor Wa of the present embodiment is made of SUS430, which is originally resistant to corrosion in comparison with iron, and also has a coating layer 21 formed on its surface, the shielded conductor Wa still has higher corrosion resistivity.

In addition, since the SUS430 is cheaper than SUS304, the price of the shielded conductor Wa can be lower than the case where SUS304 is applied.

Second Embodiment

Figure 7:
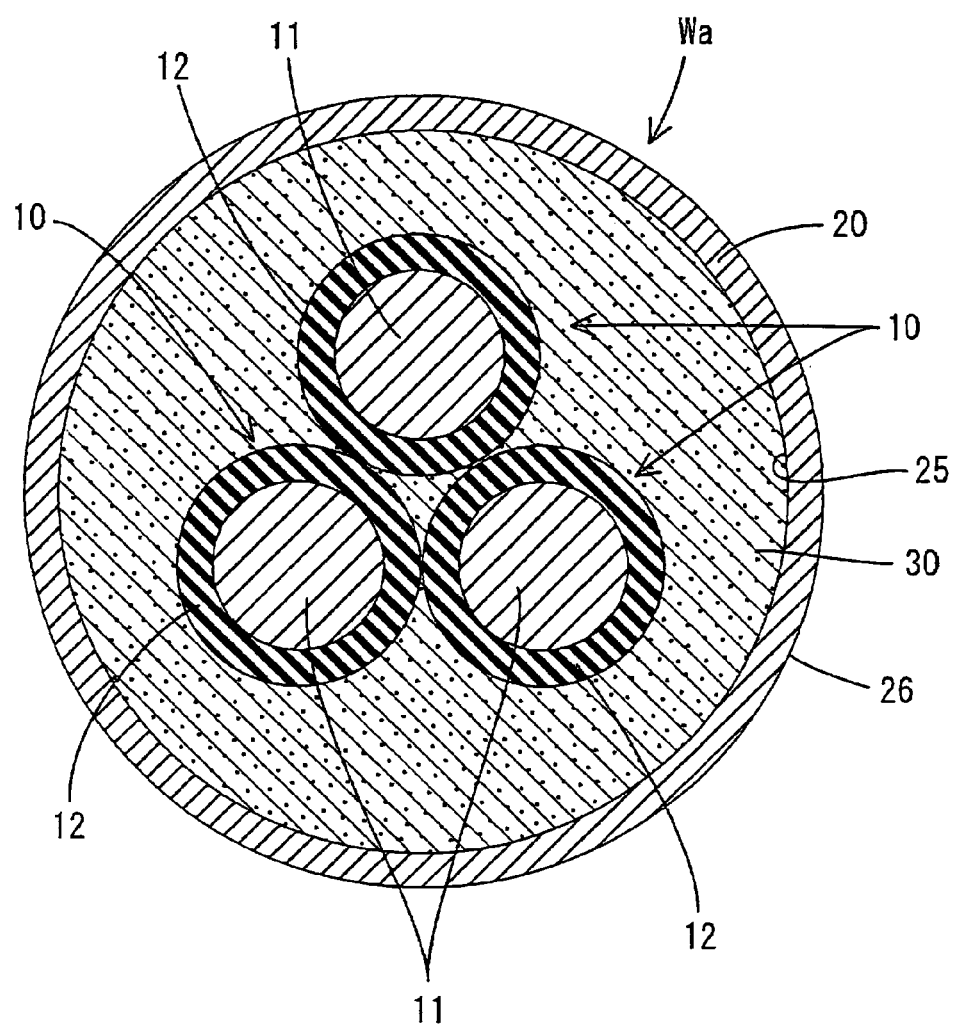
FIG. 7 is a cross-sectional view of the shielded conductor of a second embodiment.

A second embodiment will be explained with reference to FIG. 7. Constructions similar to the first embodiment are designated by the same numerals, therefore the explanations are omitted. The shielded conductor Wa of the present embodiment has the metal pipe 20 made of stainless steel and having an inner surface 25, the unshielded wires 10, and a resin layer 30. The resin layer 30 is formed between each of the unshielded wires 10 and the inner peripheral surface 25 of the metal pipe 20 through the entire length of the metal pipe 20. The resin layer 30 is formed by filling a clearance between the unshielded wires 10 each and the inner peripheral surface 25 of the metal pipe 20 with, for example, two-component urethane resin of HDI type containing ferrite powder. Heat radiated from the each unshielded wire 10 is transferred through the periphery of each insulating layer 12 and the resin layer 30 to the inner peripheral surface 25 of the metal pipe 20 and dissipated from the outer peripheral surface 26 of the metal pipe 20, and therefore the shielded conductor Wa is prevented from overheating.

In the present embodiment, furthermore, ferrite powder contained in the resin layer 30 of the shielded conductor Wa enlarges the magnetic loss in the high frequency bandwidth, which enlarges the absorbed electromagnetic wave energy P, and thus the shielding effect is improved.

Other Embodiments

The present invention is not limited to the embodiments described above. Further variations are also possible within the scope and spirit of the invention.

(1) In the shielded conductor Wa, accommodated in the metal pipe 20 are three unshielded wires 10, however, the number of the unshielded wires may be a single, two, or four or more.

(2) In the shielded conductor Wa, the three unshielded wires 10 are disposed in a stacked form having a generally triangular cross section as a whole, however, they may be disposed in a form having a vertically or horizontally aligned cross section.

(3) In the shielded conductor Wa, the metal pipe 20 has a cross-sectional circular shape, however, it may have a non-circular shape such as an oval, tetragonal, or the like cross-sectional shape.

(4) In the shielded conductor Wa, the metal pipe 20 is formed out of SUS430 stainless steel, however, it may be formed out of any other stainless steel or any other metal. The metal pipe 20 also may be a one made of resin containing magnetic powder such as ferrite powder or a one made of resin and having a coating layer containing magnetic powder.

(5) The magnetic material for the shielded conductor Wa is ferrite powder, however, it may be any other magnetic material (e.g. permalloy).

(6) The coating layer may be colored orange to indicate that the shielded conductor Wa contains a high voltage. The coating layer also does not have to be formed on the outer peripheral surface of the pipe; it may be formed on the inner peripheral surface of the pipe.

Figure 8:
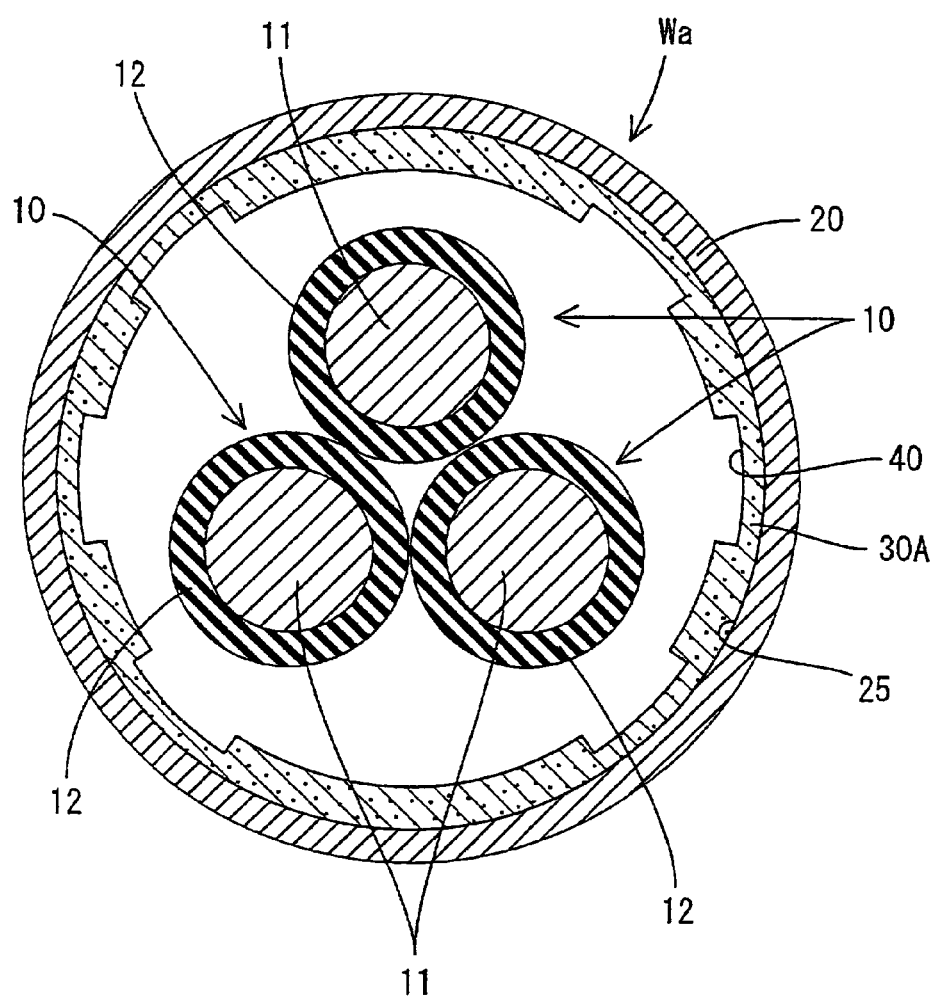
FIG. 8 is a cross-sectional view of the shielded conductor of one of the other embodiments.

(7) As shown in FIG. 8, the shielded conductor Wa may include a resin layer 30A of a predetermined thickness and the unshielded wires 10, where the resin layer 30A is in contact with the inner peripheral surface 25 of the metal pipe 20 made of stainless steel and contains a magnetic material (e.g. ferrite), while the unshielded wires 10 are inserted in a cavity defined by an inner peripheral surface of the resin layer 30A. In this case, the inner peripheral surface of the resin layer 30A may also define a plurality of grooves extending along the axial direction of the metal pipe 20 for allowing for easier insertion of the unshielded wires 10.

The invention claimed is:

1. A shielded conductor for use with an electric vehicle, comprising:
a pipe mounted on the electric vehicle, and a wire positioned in the pipe capable of supplying power to the electric vehicle, wherein the pipe includes a synthetic resin layer that contains a magnetic material, wherein the synthetic resin layer is formed on an outer surface of the pipe.

2. The shielded conductor for a vehicle according to claim 1, wherein the pipe is made of metal.

3. The shielded conductor for a vehicle according to claim 1, wherein the pipe is made of SUS430 stainless steel.

4. The shielded conductor for a vehicle according to claim 1, wherein the wire is an unshielded wire, and wherein the shielded conductor includes three unshielded wires, the three unshielded wires positioned in the pipe for transmitting three-phase electric power.

5. The shielded conductor for a vehicle according to claim 1, wherein the magnetic material is ferrite powder.

6. The shielded conductor for a vehicle according to claim 1, wherein the pipe has a non-circular shape.

7. The shielded conductor for a vehicle according to claim 6, wherein the pipe has an oval or tetragon shape.

* * * * *